(12) United States Patent
Depelteau et al.

(10) Patent No.: US 7,801,877 B1
(45) Date of Patent: Sep. 21, 2010

(54) HANDLE MEMORY ACCESS MANAGERS AND METHODS FOR INTEGRATED CIRCUIT SEARCH ENGINE DEVICES

(75) Inventors: Gary Depelteau, Ottawa (CA); Pascal de Wit, Ottawa (CA)

(73) Assignee: NetLogic Microsystems, Inc., Santa Clara, CA (US)

( * ) Notice: Subject to any disclaimer, the term of this patent is extended or adjusted under 35 U.S.C. 154(b) by 425 days.

(21) Appl. No.: 12/102,282

(22) Filed: Apr. 14, 2008

(51) Int. Cl.
*G06F 7/00* (2006.01)
(52) U.S. Cl. .................................. 707/706; 707/712
(58) Field of Classification Search .............. 707/706, 707/712, 713, 999.102, 999.001
See application file for complete search history.

(56) References Cited

U.S. PATENT DOCUMENTS

| | | | |
|---|---|---|---|
| 4,606,002 | A | 8/1986 | Waisman et al. |
| 5,430,869 | A | 7/1995 | Ishak et al. |
| 5,446,887 | A | 8/1995 | Berkowitz |
| 5,475,837 | A | 12/1995 | Ishak et al. |
| 5,560,007 | A | 9/1996 | Thai |
| 5,644,763 | A | 7/1997 | Roy |
| 5,666,494 | A | 9/1997 | Mote, Jr. |
| 5,758,356 | A | 5/1998 | Hara et al. |
| 5,787,430 | A | 7/1998 | Doeringer et al. |
| 5,813,000 | A | 9/1998 | Furlani |
| 5,822,749 | A | 10/1998 | Agarwal |
| 5,897,655 | A | 4/1999 | Mallick |
| 5,918,245 | A | 6/1999 | Yung |
| 5,924,115 | A | 7/1999 | Von Herzen et al. |
| 6,098,150 | A | 8/2000 | Brethour et al. |
| 6,115,792 | A | 9/2000 | Tran |
| 6,219,662 | B1 | 4/2001 | Fuh et al. |
| 6,389,507 | B1 | 5/2002 | Sherman |
| 6,401,117 | B1 | 6/2002 | Narad et al. |
| 6,404,752 | B1 | 6/2002 | Allen, Jr. et al. |

(Continued)

FOREIGN PATENT DOCUMENTS

WO    WO2004088548   A1   10/2004

OTHER PUBLICATIONS

Aggarwal et al. "A Model for Hierarchical Memory" *Proceedings of the Nineteenth Annual ACM Conference on Theory of Computing STOC* pp. 305-314 (1987).

(Continued)

*Primary Examiner*—Greta L Robinson
(74) *Attorney, Agent, or Firm*—Mahamedi Paradice Kreisman LLP; William L. Paradice, III

(57) ABSTRACT

Integrated circuit search engine devices include serially connected stages, a handle memory and a handle memory access manager. The stages store search keys in a multilevel tree of search keys. A first level stage is responsive to an input search key and a last level stage identifies a best match key for the input search key. The handle memory includes handle memory locations that store search result handles. The handle memory access manager searches the handle memory to retrieve a search result handle that corresponds to a best match key. The handle memory access manager refrains from modifying the handle memory in response to modify instructions during active periods of the handle memory when the handle memory is being searched. The handle memory access manager modifies the handle memory in response to the modify instructions during idle periods of the handle memory when the handle memory is not being searched. Related methods are also disclosed.

22 Claims, 7 Drawing Sheets

U.S. PATENT DOCUMENTS

| | | |
|---|---|---|
| 6,421,730 B1 | 7/2002 | Narad et al. |
| 6,430,527 B1 | 8/2002 | Waters et al. |
| 6,441,053 B1 | 8/2002 | Klein et al. |
| 6,460,112 B1 | 10/2002 | Srinivasan et al. |
| 6,460,120 B1 | 10/2002 | Bass et al. |
| 6,490,592 B1 | 12/2002 | St. Denis et al. |
| 6,522,632 B1 | 2/2003 | Waters et al. |
| 6,535,491 B2 | 3/2003 | Gai et al. |
| 6,539,369 B2 | 3/2003 | Brown |
| 6,553,370 B1 | 4/2003 | Andreev et al. |
| 6,564,211 B1 | 5/2003 | Andreev et al. |
| 6,633,865 B1 | 10/2003 | Liao |
| 6,636,849 B1 | 10/2003 | Tang et al. |
| 6,636,956 B1 | 10/2003 | Venkatachary et al. |
| 6,662,287 B1 | 12/2003 | Andreev et al. |
| 6,691,124 B2 | 2/2004 | Gupta et al. |
| 6,694,323 B2 | 2/2004 | Bumbulis |
| 6,697,276 B1 | 2/2004 | Pereira et al. |
| 6,757,779 B1 | 6/2004 | Nataraj et al. |
| 6,768,739 B1 | 7/2004 | Kobayashi et al. |
| 6,778,530 B1 | 8/2004 | Greene |
| 6,831,850 B2 | 12/2004 | Pereira et al. |
| 6,839,800 B2 | 1/2005 | Stark |
| 6,934,795 B2 | 8/2005 | Nataraj et al. |
| 6,941,314 B2 | 9/2005 | Andreev et al. |
| 6,944,709 B2 | 9/2005 | Nataraj et al. |
| 7,016,904 B1 | 3/2006 | Grove et al. |
| 7,017,021 B2 | 3/2006 | Gupta et al. |
| 7,023,807 B2 | 4/2006 | Michels et al. |
| 7,035,844 B2 | 4/2006 | Andreev et al. |
| 7,047,317 B1 * | 5/2006 | Huie et al. ............... 709/245 |
| 7,076,602 B2 | 7/2006 | Stark et al. |
| 7,107,263 B2 | 9/2006 | Yianilos et al. |
| 7,231,373 B2 | 6/2007 | Kidd et al. |
| 7,231,383 B2 | 6/2007 | Andreev et al. |
| 7,257,530 B2 | 8/2007 | Yin |
| 7,289,979 B2 | 10/2007 | Wilson |
| 7,292,162 B2 | 11/2007 | Somasundaram |
| 7,697,518 B1 * | 4/2010 | de Wit ..................... 370/389 |
| 7,716,204 B1 * | 5/2010 | Depelteau et al. ........... 707/706 |
| 7,725,450 B1 * | 5/2010 | Depelteau et al. ........... 707/706 |
| 2002/0089937 A1 | 7/2002 | Venkatachary et al. |
| 2002/0152413 A1 * | 10/2002 | Waters et al. ............... 714/1 |
| 2003/0004921 A1 * | 1/2003 | Schroeder ................. 707/1 |
| 2003/0093613 A1 | 5/2003 | Sherman |
| 2003/0163445 A1 * | 8/2003 | Oza et al. .................. 707/1 |
| 2004/0030686 A1 | 2/2004 | Cardno et al. |
| 2004/0146009 A1 * | 7/2004 | Khawand .................. 370/252 |
| 2004/0193619 A1 | 9/2004 | Venkatachary et al. |
| 2004/0249803 A1 | 12/2004 | Vankatachary et al. |

OTHER PUBLICATIONS

"B-Trees: Balanced Tree Data Structures" pp. 1-8 (believed prior to Nov. 27, 2006) <http://www.bluerwhite.org/btree/>.

Chang et al. "Dynamic Routing Tables using Augmented Balanced Search Tree" *National Cheng Kung University and I-Shou University* (35 pages)(believed prior to Jul. 23, 2004).

Choudhury et al. "A New Buffer Management Scheme for Hierarchical Shared Memory Switches" *IEEE/ACM Transactions on Networking (TON)* 5(5):728-738 (1997).

Djordjevic et al. "A Hierarchical Memory System Environment" *Proceedings of the 1988 Workshop on Computer Architecture Education WCAE* (6 pages)(1998).

Lu et al. "A B-Tree Dynamic Router-Table Design" pp. 1-27 (believed prior to Nov. 27, 2006).

O'Connor et al. "The iFlow Address Processor" 2001 *IEEE Micro* pp. 16-23 (2001).

Suri et al. "Multiway Range Trees: Scalable IP Lookup with Fast Updates" (5 pages)(believed prior to Nov. 27, 2006) http://www.cs.edu/~Varghese/PAPERS/globecome2001.pdf.

\* cited by examiner

HANDLE MEMORY ACCESS MANAGERS AND METHODS FOR INTEGRATED CIRCUIT SEARCH ENGINE DEVICES

FIELD OF THE INVENTION

This invention relates to integrated circuit devices and, more particularly, to integrated circuit search engine devices and methods of operating same.

BACKGROUND OF THE INVENTION

Integrated circuit search engine devices are widely used to perform linear searches of input search keys to find best match keys. In order to facilitate searching, an integrated search engine device may include a plurality of serially connected stages, a respective one of which is configured to store therein a respective level of search keys in a multilevel tree of search keys, such as a B-tree of search keys. The serially connected stages include a first or root level stage that is responsive to an input search key, and a last or leaf level stage that is configured to identify the best match key for the input search key. A handle memory also is provided, including a plurality of handle memory locations, a respective one of which is configured to store a search result handle, also generally referred to as a handle. The handle memory is responsive to the last level stage to retrieve a handle that corresponds to the best match key.

Integrated circuit search engine devices may be used in many applications. One application is that of a route accelerator that supports search acceleration for packet forwarding in a router.

SUMMARY OF THE INVENTION

Integrated circuit search engine devices according to some embodiments of the invention include a plurality of serially connected stages, a handle memory and a handle memory access manager. A respective one of the plurality of serially connected stages is configured to store therein a respective level of search keys in a multilevel tree of search keys. The plurality of serially connected stages include a first level stage that is responsive to an input search key and a last level stage that is configured to identify a best match key for the input search key. The handle memory includes a plurality of handle memory locations, a respective one of which is configured to store a search result handle. The handle memory access manager is configured to search the handle memory to retrieve a search result handle that corresponds to a best match key, in response to identification of the best match key by the plurality of serially connected stages. The handle memory access manager is also configured to refrain from modifying the handle memory in response to modify instructions from the plurality of serially connected stages during active periods of the handle memory when the handle memory is being searched to retrieve a search result handle that corresponds to a best match key in response to identification of the best match key by the plurality of serially connected stages. The handle memory access manager is further configured to modify the handle memory in response to the modify instructions from the plurality of serially connected stages during idle periods of the handle memory when the handle memory is not being searched to retrieve a search result handle that corresponds to a best match key in response to identification of the best match key by the plurality of serially connected stages.

In some embodiments, the handle memory access manager includes a handle lookup engine, a handle modification engine and a multiplexer. The handle lookup engine is configured to search the handle memory to retrieve a search result handle that corresponds to a best match key, in response to identification of the best match key by the plurality of serially connected stages. The handle modification engine is configured to modify the handle memory in response to modify instructions from the plurality of serially connected stages. The multiplexer is configured to selectively connect the handle lookup engine or the handle modification engine to the handle memory under control of the handle lookup engine, so that the handle lookup engine sets the active periods and the idle periods of the handle memory.

In some embodiments, the handle modification engine includes a modification instruction queue, a read request queue, a write request queue and logic. The modification instruction queue is configured to receive the modify instructions from the plurality of serially connected stages. The modify instructions include therein high level commands that generate handle memory read requests and handle memory write requests. The read request queue is configured to store the handle memory read requests that are generated from the handle modify instructions. The write request queue is configured to store the handle memory write requests that are generated from the modify instructions. The logic is configured to generate the handle memory read requests and the handle memory write requests that are included in the modify instructions, and to provide the handle memory read requests and the handle memory write requests to the read request queue and the write request queue, respectively.

In other embodiments, the handle modification engine may also include a work conserving round robin device. The work conserving round robin device is configured to alternately supply to the multiplexer a memory read request from the read request queue and a memory write request from the write request queue if both queues contain a request, and to continue to supply to the multiplexer a memory read request or a memory write request if the write request queue or the read request queue, respectively, is empty.

Moreover, in some embodiments, a given modify instruction generates an initial burst of handle memory read requests and a delayed burst of handle memory write requests that are placed in the read request queue and the write request queue, respectively, by the logic. In these embodiments, the work conserving round robin device initially supplies handle memory read requests from the initial burst to the multiplexer until a memory write request from the delayed burst appears in the write request queue. The work conserving round robin device then alternately supplies handle memory read requests and handle memory write requests to the multiplexer until remaining handle memory read requests in the initial burst are supplied to the multiplexer. The work conserving round robin device then supplies remaining write requests to the multiplexer until the remaining write requests are supplied to the multiplexer.

In some embodiments, the handle memory may include a same number of handle locations for each key in the multilevel tree of search keys. In other embodiments, different numbers of handle locations per key are provided in different ones of the stages of the multilevel tree. In still other embodiments, the handle memory may include larger numbers of handle locations for keys in the first level stage compared to the last level stage of the multilevel tree of search keys.

Integrated search engine devices according to other embodiments of the present invention include a plurality of serially connected stages and a handle memory as described above, and a handle lookup engine, a handle modification engine and a multiplexer. The handle lookup engine is configured to search the handle memory to retrieve a search result handle that corresponds to a best match key in response to identification of the best match key by the plurality of serially connected stages. The handle modification engine is configured to modify the handle memory in response to modify instructions from the plurality of serially connected stages. The multiplexer is configured to selectively connect the handle lookup engine or the handle modification engine to the handle memory under control of the handle lookup engine. A modification instruction queue, read request queue, write request queue, logic and/or a work conserving round robin device according to the above-described embodiments may also be provided.

Handle management methods for an integrated circuit search engine device that includes a plurality of serially connected stages and a handle memory may be provided according to other embodiments of the present invention. Handle management methods according to these embodiments may include searching the handle memory to retrieve a search result handle that corresponds to a best match key in response to identification of the best match key by the plurality of serially connected stages. These methods also include refraining from modifying a handle memory in response to modify instructions from the plurality of serially connected stages during active periods of the handle memory when the handle memory is being searched to retrieve a search result handle that corresponds to a best match key in response to identification of the best match key by the plurality of serially connected stages. Finally, these methods also modify the handle memory in response to the modify instructions from the plurality of serially connected stages during idle periods of the handle memory when the handle memory is not being searched to retrieve a search result handle that corresponds to a best match key in response to identification of the best match key by the plurality of serially connected stages.

Handle management methods according to other embodiments of the invention may also include receiving the modify instructions from the plurality of serially connected stages, the modify instructions including therein high level commands that generate handle memory read requests and handle memory write requests. The handle memory read requests and handle memory write requests are generated from the high level commands. The handle memory read requests are stored in a read request queue and the handle memory write requests are stored in a write request queue. Other embodiments include alternately supplying to the handle memory a memory read request from the read request queue and a write request from the write request queue if both queues contain a request, and supplying to the handle memory a memory read request or a memory write request if the write request queue or the read request queue, respectively, is empty.

Moreover, a given modify instruction may generate an initial burst of handle memory read requests and a delayed burst of handle memory write requests that are stored in the read request queue and the write request queue, respectively. In these embodiments, handle memory management methods may also include initially supplying handle memory read requests from the initial burst to the handle memory until a memory write request from the delayed burst appears in the write request queue, then alternately supplying handle memory read requests and handle memory write requests to the handle memory until remaining handle memory read requests in the initial burst are supplied to the handle memory, and then supplying the remaining write requests to the handle memory until the remaining write requests are supplied to the handle memory.

DETAILED DESCRIPTION

Figure 1:
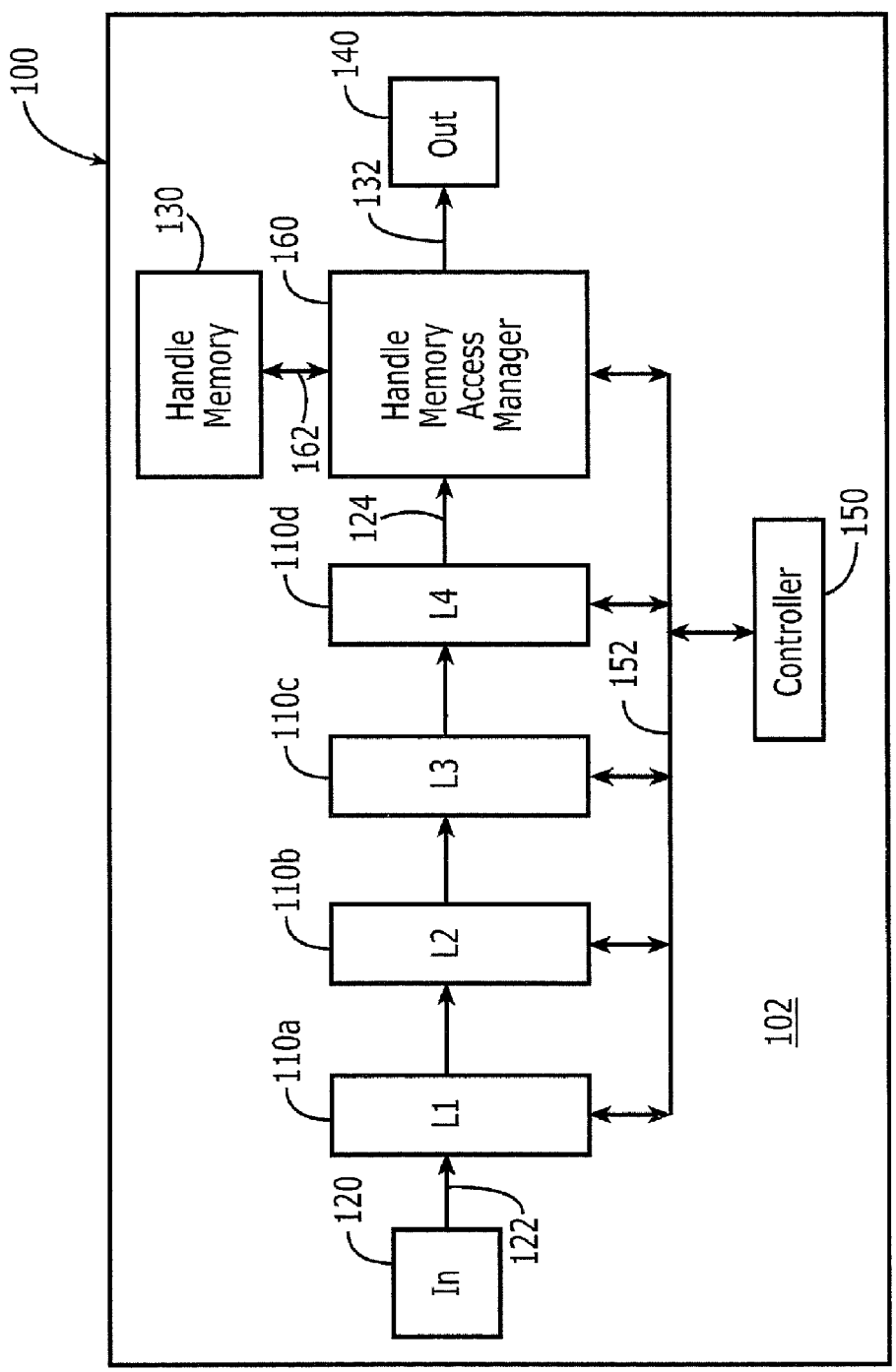
FIG. 1 is a functional block diagram of an integrated circuit search engine device according to various embodiments of the present invention.

Exemplary embodiments now will be described more fully hereinafter with reference to the accompanying figures, in which embodiments are shown. There may be alternate embodiments in many alternate forms, and the embodiments described herein should not be construed as limiting.

Accordingly, while exemplary embodiments are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including", and variants thereof, when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, and variants thereof, it can be directly responsive to the other element, or intervening elements may be present. In contrast, when an element is referred to as being "directly responsive" to another element, and variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods and/or apparatus (systems and/or devices). It is understood that a block of the block diagrams and/or flowchart illustrations, and combinations of blocks in the block diagrams and/or flowchart illustrations, can be embodied in hardware and/or in software (including firmware, resident software, micro-code, etc.), to provide means (functionality) and/or structure for implementing the functions/acts specified in the block diagrams and/or flowchart block or blocks; and/or to provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 is a functional block diagram of an integrated circuit search engine device 100 according to some embodiments of the present invention. In these devices 100, all of the blocks contained therein are embodied in one or more semiconductor integrated circuit substrates, and in some embodiments, in a single semiconductor integrated circuit substrate 102, also referred to herein as a "chip". Other functionality may also be provided on the integrated circuit substrate 102.

Still referring to FIG. 1, a plurality of serially connected stages 110a-110d are provided. The stages 110a-110d may also be referred to as a lookup core. Although four stages are illustrated in FIG. 1, fewer or larger numbers of stages may also be provided according to other embodiments of the present invention. A respective one of the stages 110a-110d is configured to store therein a respective level L1-L4 of search keys in a multilevel tree of search keys. The search keys may be stored in a B-tree, a B*-tree and/or any other tree structure. A first level stage L1 (110a), also referred to a "root stage", is responsive to an input search key 122 that may be provided by an input interface 120 and a last level stage L4 (110d), also referred to as a "leaf stage", is configured to identify a best match key 124 for the input search key 122. Each stage 110a-110d may include a memory, buffers and/or comparators, and may be arranged in a pipeline arrangement to increase the maximum search rate. This configuration of serially connected stages that are configured to store therein levels of search keys in a multilevel tree of search keys may also be referred to as an "algorithmic search engine", that may be contrasted with a single level Content Addressable Memory (CAM).

A handle memory access manager 160 is also provided according to various embodiments of the present invention. The handle memory access manager 160 is configured to manage the modification of a handle memory 130 concurrently with searches of the same data structure, as will be described in detail below.

The handle memory 130 includes a plurality of handle memory locations, a respective one of which is configured to store at least one search result handle. The handle memory 130 is responsive to the last level stage 110d, for example via the handle memory access manager 160, to retrieve a search result handle that corresponds to the best match key 124. The handle 132 that is retrieved is provided to an output interface 140, for example via the handle memory access manager 160.

Thus, in some embodiments, the handle memory access manager 160 can control communications with the handle memory 130 via a single port 162. A controller 150 may be used to control the stages 110a-110d and the handle memory access manager 160, for example using a handle update control interface 152. A single controller or multiple distributed controllers may be used.

Figure 2:
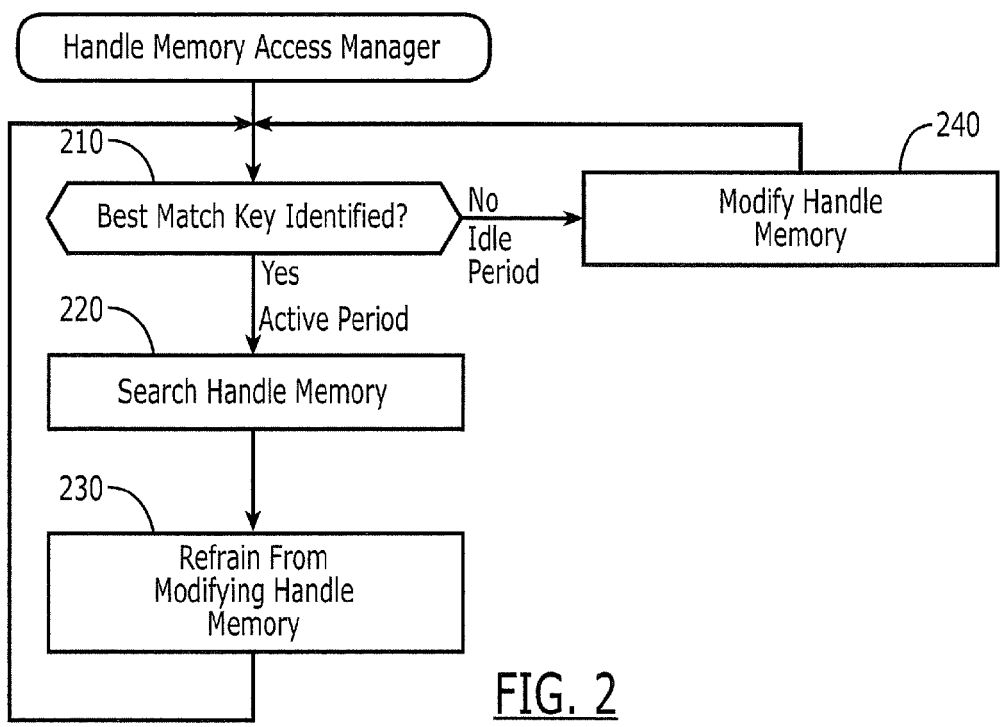
FIG. 2 is a flowchart of operations that may be performed by a handle memory access manager according to various embodiments of the present invention.

FIG. 2 is a flowchart of operations that may be performed by a handle memory access manager, such as the handle memory access manager 160 of FIG. 1, according to various embodiments of the present invention. As shown in FIG. 2, at Block 210, a determination is made as to whether a best match key has been identified by the plurality of serially connected stages L1-L4 of FIG. 1. If a best match key has been identified, then the handle memory is in an active period, and the handle memory is searched at Block 220 to retrieve a search result handle that corresponds to the best match key in response to the identification of the best match key by the plurality of serially connected stages at Block 210. During the active period, at Block 230, the handle memory access manager also refrains from modifying the handle memory in response to modify instructions from the plurality of serially connected stages when the handle memory is being searched to retrieve a search result handle that corresponds to a best match key, in response to identification of the best match key by the plurality of serially connected stages.

Referring again to Block 210, if a best match key has not been identified, then the handle memory is in an idle period. As shown at Block 240, the handle memory access manager may be configured to modify the handle memory in response to the modify instructions from the plurality of serially connected stages, during the idle periods of the handle memory, i.e., when the handle memory is not being searched to retrieve a search result handle that corresponds to a best match key in response to identification of the best match key by the plurality of serially connected stages. Thus, modifications may be performed during an idle period or in background mode when the handle memory is not being used to perform searches.

Figure 3:
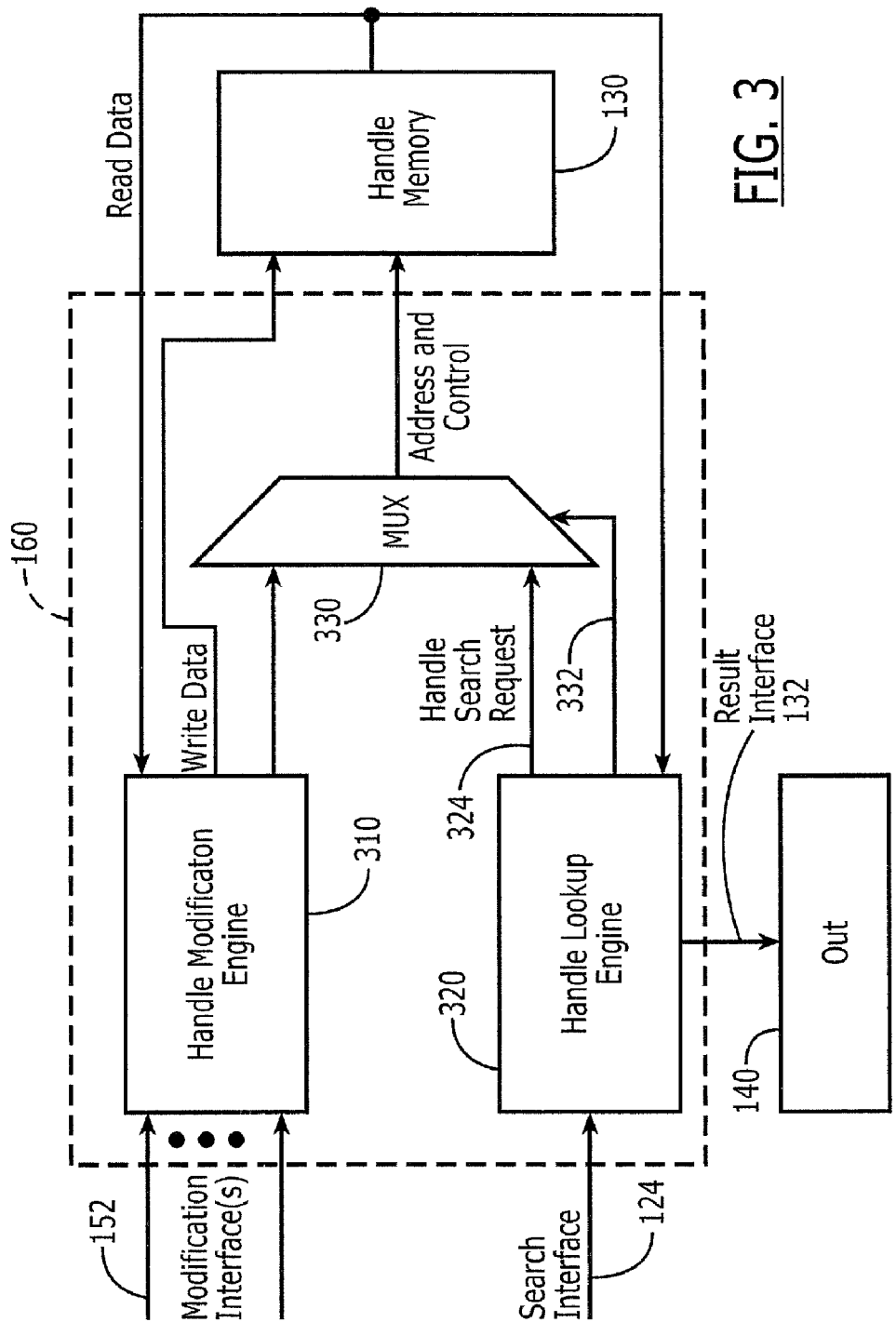
FIG. 3 is a functional block diagram of a handle memory access manager according to various embodiments of the present invention.

FIG. 3 is a functional block diagram of a handle memory access manager, such as the handle memory access manager 160 of FIG. 1, according to some embodiments of the invention. As shown in FIG. 3, the handle memory access manager 160 may include handle lookup engine 320 that is configured to search the handle memory 130 to retrieve a search result handle 132 that corresponds to a best match key in response to identification of the best match key by the plurality of serially connected stages 110. The best match key may be provided to the handle lookup engine 320 via a search interface, which may correspond to the best match key interface 124 of FIG. 1. The handle memory access manager 160 also includes a handle modification engine 310 that is configured to modify the handle memory 130 in response to modify instructions from the plurality of serially connected stages 110. Modify instructions may be provided by all of the stages, for example using a plurality of modification interfaces 152. A multiplexer (MUX) 330 is also provided that is configured to selectively connect the handle lookup engine 320 or the handle modification engine 310 to the handle memory 130, under control of the handle lookup engine 320 using, for example, a multiplexer control line 332 that is under control of the handle lookup engine 320. The handle lookup engine 320 thus sets the active periods and the idle periods of the handle memory 130, for example using control line 332.

Thus, the search interface 124 issues a handle retrieval request upon the completion of a key search within the algorithmic search engine lookup core 110, which only contains keys. The outcome of a search is issued on the result interface 132, and contains the requested handle.

Moreover, when the algorithmic search engine's lookup core structure is modified due to either an insertion or deletion, the modification needs to be reflected in the handle memory storage structure as well. In some embodiments, in order to enable efficient handle memory modifications, each level in a pipelined B-Tree may include its own dedicated modification interface 152 to request handle memory modifications, such as move, copy and write. A non-pipelined B-Tree may use only a single modification interface 152. When a B-Tree level requires a modification of a handle to reflect updates made to a related key, high level instructions are issued over the modification interface 152. Modification instructions are captured by the handle modification engine 310, which is charged with the reading and writing of the handle memory 130 in order to perform commanded modifications during idle handle memory cycles, i.e., when no search read is occurring. The handle memory 130 can be either internal (on chip) or external (off chip) to the device.

Accordingly, FIG. 3 illustrates how to arbitrate between handle memory searches (reads) and modifications (reads and writes). Handle memory searches are given the right of way, and are serviced as they arrive. When not performing searches, and only then, the handle modification engine 310 can issue either reads or writes to the handle memory as needed. Once issued, writes to the handle memory 130 can be effective immediately, while reads from the memory generally are received some fixed amount of time later. Thus, the search has priority and the handle modification engine 310 performs modifications in background or idle mode.

Figure 4:
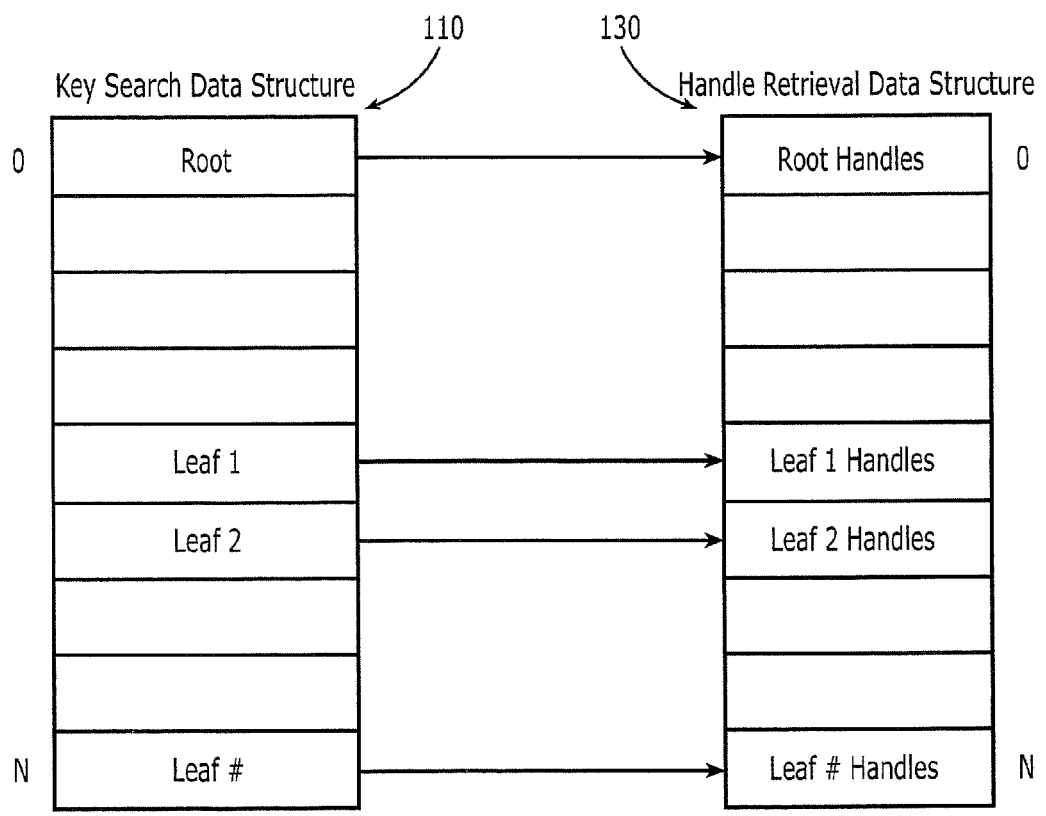
FIGS. 4 and 5 illustrate a data structure of a lookup core and a handle memory according to various embodiments of the present invention.
Figure 5:
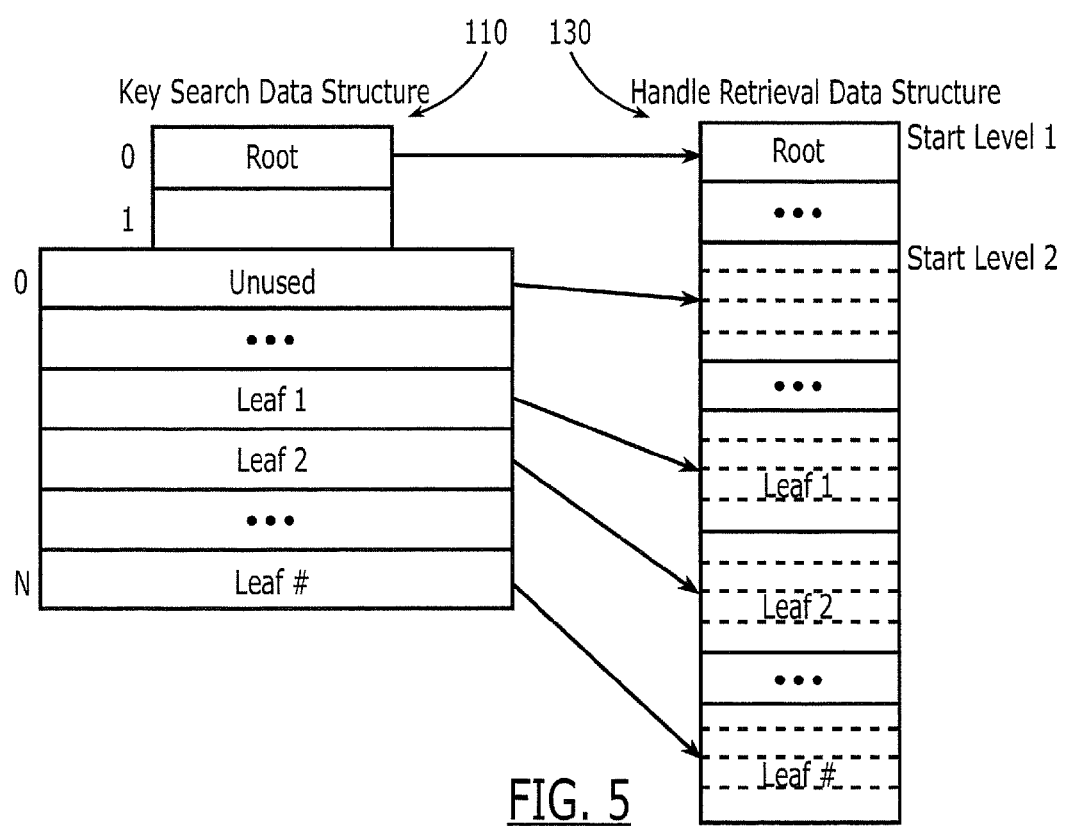

A handle memory access manager according to various embodiments of the present invention can handle various mappings between the data structures of the key search data and the handle retrieval data. In particular, in some embodiments, the handle memory may include a same number of handle locations for each key in the multilevel tree of search keys, as illustrated in FIG. 4. In other embodiments, the handle memory may include multiple keys per node at all levels of the multilevel tree of search keys but may only include multiple handles per key at levels above the last level stage, as illustrated in FIG. 5. Thus, some embodiments may include larger numbers of handle locations for keys in the first level stage compared to the last level stage.

More specifically, referring again to FIG. 4, a 1:1 key and handle mapping is illustrated. A simple 1:1 mapping of key words to handle words can be performed, so that each handle word is sized to accommodate the maximum number of handles for the key word it represents. This arrangement may be best suited to a design that has similar or identical number of handles per key for each level of the search three. In contrast, in FIG. 5, in a potentially more highly optimized and pipelined design, different B-Tree levels will likely have a different number of handles per key, so that differing amounts of handle storage may be needed for various portions of the search tree, since there is at least one handle associated with every key and generally much more than one handle per key in a Span Prefix Mask (SPM) tree for non-leaf levels. Such a situation may require the handle memory to be provisioned so that it can accommodate the largest number of expected handles, with each handle word possibly spanning multiple physical handle memory addresses, as illustrated in FIG. 5. In order to determine the address to read in the 1:N case of FIG. 5, the best/exact match key should indicate the level that it was found on, the word it was found in, the position within the word it was found, and the SPM position with the word (for non-leaf levels). Each of these identifiers may be needed to formulate the address within the handle memory to read, as well as to ensure that the proper handle is selected from the word or part word that is fetched.

FIG. 5 illustrates an example two level B-Tree, with a different number of handles per level, represented by different word widths. Level 1 uses only a single handle per key, while level 2 uses multiple (e.g., four) handle addresses per key. In order to properly access handles, the search request should not only specify the level the handle is to be retrieved from, but also which level the best/exact match was found, the location of the search word, and SPM position (non-leaf only). Knowing the desired level allows address generation logic to add an offset amount to the starting address based on the specified level. Additionally, the key number, which can be zero-based for each level, may be modified to account for the number of addresses used by each related handle word (in the case of FIG. 5, one or four, depending on the level).

Figure 6:
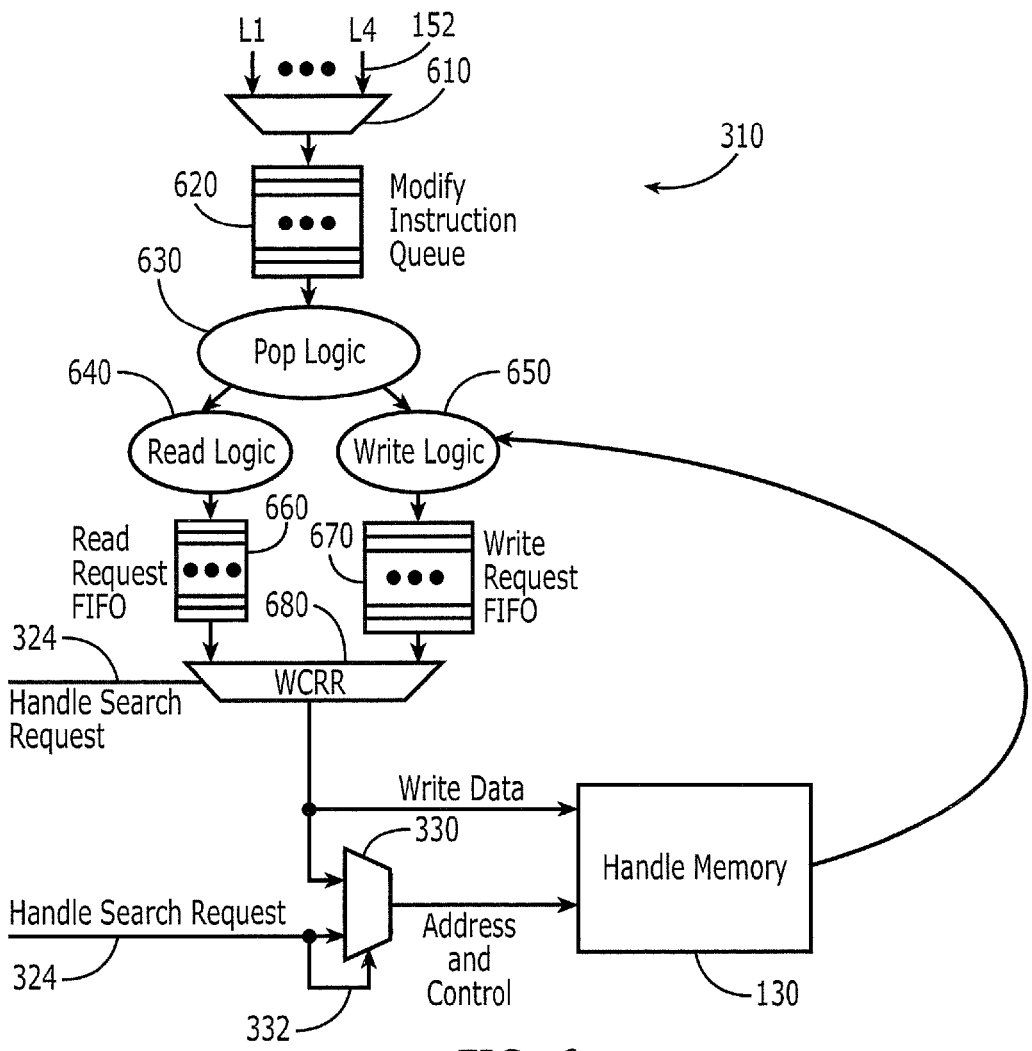
FIG. 6 is a functional block diagram of a handle modification engine according to various embodiments of the present invention.

FIG. 6 is a functional block diagram of a handle modification engine, such as the handle modification engine 310 of FIG. 3 according to various embodiments of the present invention. As shown in FIG. 6, these embodiments of a handle modification engine 310 include a modify instruction queue 620, which may be in the form of a first-in, first-out (FIFO) memory that is configured to receive the modify instructions from the plurality of serially connected stages L1-L4. The modify instructions include high level commands that generate handle memory read requests and handle memory write requests. A read request queue, such as a read request FIFO 660 is configured to store handle memory read requests that are generated from the modify instructions. A write request queue, such as a write request FIFO 670, is configured to store handle memory write requests that are generated from the modify instructions. Logic, including pop logic 630, read logic 640 and write logic 650, is configured to generate the handle memory read requests and the handle memory write requests that are included in the modify instructions in the modify instruction queue 620, and to provide the handle memory read request and the handle memory write request to the read request queue and the write request queue, respectively. More specifically, the pop logic 630 supplies the high level commands to the read logic 640 and write logic 650 as appropriate, and the read/write logic 640/650 translates or interprets the high level commands to generate the stream of read/write requests.

Still referring to FIG. 6, the handle modification engine 310 may also include a Work Conserving Round Robin (WCRR) scheduler 680. The WCRR device 680 is configured to alternately supply to the multiplexer 330 a memory read request from the read request queue 660 and a memory write request from the write request queue if both queues 660 and 670 contain a request, and to continue to supply to the multiplexer 330 a memory read request or a memory write request if the write request queue 670 or the read request queue 660, respectively, is empty.

More specifically, efficient handle updates may be provided while simultaneously supporting increased or maximum handle search performance using embodiments of FIG. 6. High level modify instructions are queued in the modify instruction queue 620 by multiplexing the various modify instruction requests 152 that are received from the plurality of interconnected stages L1-L4 via a multiplexer 610, so that the issuing B-Tree level that sources handle commands need not be concerned with their progress. The modify instruction queue 620 may be sized to accommodate the maximum number of commands expected. In some embodiments, a separate handle modification engine 310 may be provided for each level L1-L4, so that the modify instruction queue 620 may be sized to accommodate the maximum number of commands expected from any one level. In these embodiments, only one level at a time may be allowed to issue instructions in order to potentially simplify the design. In other embodiments, multiple levels may issue instructions simultaneously, at a potential cost of an increased size of the modify instruction queue 620, or an increase in the number of modify instruction queues 620.

The combination of the pop logic 630, read logic 640 and write logic 650 can transform all the high level modify instructions in the modify instruction queue 620 into a simplified sequence of read-modify-write operations. Each high level command is popped off the modify instruction queue 620 by the pop logic 630, and used as a seed for a new command or set of commands. Starting addresses and handle locations for both the reads and resulting writes may be calculated based on some or all of the following: to-from levels; to-from word pointer (which may be zero-based for each level); key sizes; to/from key position within a word; to/from key position within SPM (if not leaf); operation code; repetition count; and/or handle. The generation of a command or set of commands from a high level command can vary depending upon the internal design of a given search engine and need not be described in detail herein.

Command instructions may be interpreted differently depending upon the operation code that is received. For instance, a copy can be modified by a repetition count, which can be used to indicate either the number of handles to copy from memory location A to B; the number of keys, which could each have SPM associated handles, to copy from memory location A to B; or even the number of words to copy. It is likely that the number of handles/words that the high level indicates to manipulate is greater than can be accomplished by a single memory operation. Accordingly, the read and write logic 640/650 can digest the high level command and synthesize as many smaller finite instructions as needed to perform the desired operation. These smaller memory word-specific commands are then performed during idle cycles of the handle memory.

Increased efficiency may be obtained, according to some embodiments, by masking the lag between reads and related writes by issuing multiple reads in succession, and only allocating bandwidth to writes once there is data to be written back to the handle memory. This may be accomplished by using a work conserving round robin device 680, which services either reads or writes, depending upon what work is available. Under a round robin queuing discipline, packets are sorted into classes (such as read and write), and service is alternated among the classes. A work conserving queuing discipline will not allow a link to remain idle whenever there are packets of any class queued for transmission. Thus, a work conserving round robin device that looks for data of a given class but finds none, will check a next class in the round robin sequence.

Figure 7:
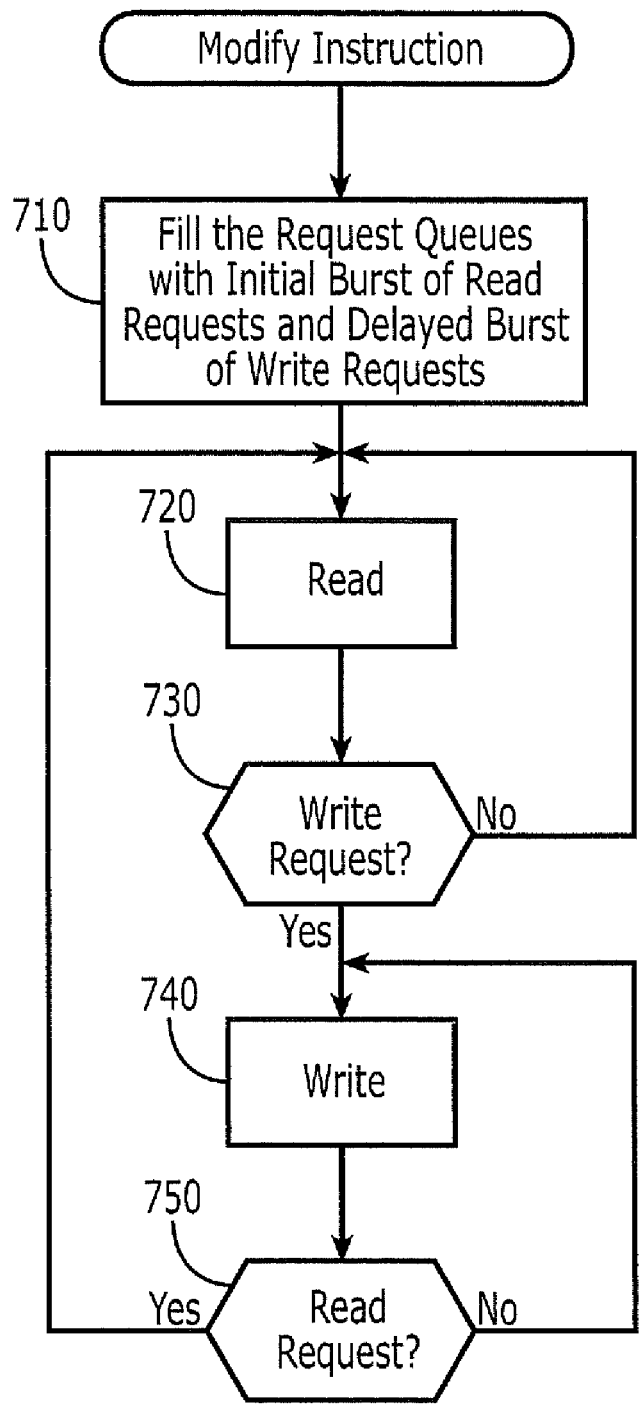
FIG. 7 is a flowchart of operations to process a modify instruction according to various embodiments of the present invention.

FIG. 7 is a flowchart of operations that may be performed to process a modify instruction using embodiments of FIG. 6, according to some embodiments of the invention. At Block 710, a given modify instruction generally can generate an initial burst of handle memory read requests and a delayed burst of handle memory write requests that are placed in the read request queue 660 and the write request queue 670, respectively, by the read logic 640 and the write logic 650, after retrieval by the pop logic 630. The write requests generally are delayed relative to the read requests, because most modification instructions can be categorized as read/modify/write. As such, these instructions generate the reading of data and eventual writing back of a modified version of the same data. The delay occurs because the write logic 650, which in some embodiments is really "write and modify logic", generally needs to wait until it has generated enough modified write data from received read data and modification instructions Thus, initially a read instruction is encountered at Block 720, so that the work conserving round robin device 680 initially supplies handle memory read requests from the initial burst through the multiplexer 332 until a memory write request from the delayed burst appears in the write request queue 670, as shown at Block 730. After a write request appears at Block 730, then the handle memory is supplied with the write request at Block 740 and, upon appearance of a read request at Block 750, is supplied with read request at Block 720. Thus, read requests and write requests are alternately supplied to the multiplexer 330 until the remaining handle memory read requests in the initial burst are supplied to the multiplexer 330. Once write requests are all that is left, remaining write requests are supplied to the multiplexer 330 at Block 740 until the remaining write requests are supplied.

Thus, embodiments of the present invention can be self-regulating, since a burst of initial reads will eventually spawn a matching burst of writes which are issued in an alternating manner with any remaining reads. Once all reads have been exhausted, writes may be serviced exclusively until all have been performed. When the last write operation has been completed, a new high level command can be popped from the modify instruction queue 620, and the operations can start again.

Additional discussion of various embodiments of the present invention will now be provided. In particular, a high density, self-contained integrated circuit algorithmic search engine represents a new device type made possible by recent System-on-a-Chip advances. Embodiments of the invention can replace and/or supplement Content Addressable Memories (CAMs) at higher bit densities (e.g., 20/40/80 Mb and beyond). At a very high level, an algorithmic search engine can operate like a CAM in that keys are stored in a specific order and searches result in a predictable handle return. Embodiments of the invention are directed to how an algorithmic search engine performs efficient modification to a data structure during searches. Handles are described herein, but embodiments of the invention can also apply to the search structure in general.

By implementing separate key and handle data structures, an algorithmic search engine can improve or optimize the use of limited bandwidth in at least two ways. First, only keys and search supporting data are read during the search tree's traversal. Thus, removing handles from search data can allow an increase in tree way-ness for the same word width. Second, handle(s) can only be retrieved from storage if a search is successful. Multiple copies of the same handle can also be contained (useful for SPM B-Tree).

However, separating keys from handles means that modifications performed on the search structure's (for example, a B-Tree) keys during insertions and deletions need to be reflected in the related handle storage structures. Modifications to the handle structures may be issued on a per search structure level basis over level-specific modification interfaces 152. Modifications can be requested using a compact instruction format which informs the handle modification engine 310 about the desired operation (op-code, indicating instructions such as copy or move); source and destination levels (for inter/intra level handle movement); source and destination pointers (0 based addresses with respect to key words); source and destination key pointers (which key/handle within a word is to be worked on); source and destination SPM pointers (which handle with respect to a key is to be worked on, non-leaf); handle (if one is needed by the instruction); movement/copy count (to know how many words/keys/handles the instruction relates to); and/or key size of related handle (to set up key size-specific variables).

So as not to impede key search structure modifications, in some embodiments, the handle modification engine 310 can simply accept instructions from the B-Tree levels L1-L4 without a cumbersome acknowledgement protocol. Handle modification instructions may be queued up in a modify instruction queue 620 and a signal may be broadcast to all B-Tree levels indicating if the handle modification engine's local instruction queue 620 is empty or not. By sizing the queue 620 for the maximum number of instructions that could be issued by a single level and knowing that tree updates are performed sequentially on a level-by-level basis, overflows can be reduced or avoided in some embodiments. Other forms of queuing/flow control may be used in other embodiments of the invention.

Modification instructions are retrieved from the queue 620 one at a time and are worked on so long as there is sufficient space in the read request FIFO 660. The read request FIFO 660 and the companion write request FIFO 670 are only serviced when there is an available access cycle to the handle memory. This behavior can provide efficient use of handle memory bandwidth and can allow the device as a whole to perform simultaneous searches and updates while reducing, minimizing or eliminating performance degradation with respect to search performance.

In order to create a seamless stream of operations to the handle memory 130 that include both searches (which are exclusively reads) and modifications (which are a mixture of reads and writes) the handle modification engine 310 can preview the search path and look for opportunities to slip in modification related reads and writes.

To ensure that modification related read and write commands are ready for use when an available handle memory access slot or time arrives, the handle modification engine 310 employs separate read 640 and write 650 logic. By separating the read 640 and write 650 logic, some embodiments can allow the read logic 640 to freewheel and issue as many read requests as the system will accommodate. The read logic 640 thus can either exhaust its mandate or fill its local FIFO 660 due to insufficient free slots in the search stream or by reduced memory access from the returning write data, which was spawned by a previously serviced read.

Alternating (ping-ponging) between the read 660 and write 670 FIFOs when both have work available using the WCRR device 680 can ensure that a natural equilibrium is reached between the two competing functions. Thus, whenever the write logic 650 can generate a complete write data word in the write request FIFO 670, and whenever there is an entry in the write request FIFO 670 and the read request FIFO 660, the WCRR 680 alternates between the two FIFOs. Additionally, when the search path is heavily used and read/write access to the handle memory is limited, the read request FIFO 660 will fill and halt the generation of additional read requests.

The write FIFO 670 may also fill during periods of limited handle memory access. However, write requests are generally a result of a processed read and, as such, a halt in servicing read requests generally will be followed by a subsequent halt in write requests, once the pipeline has been flushed after, for example, a couple of cycles. Due to this relationship, the write request FIFO 670 may not need to be as deep as the read request FIFO 660.

In conclusion, handle memory access management according to some embodiments of the present invention may be contrasted with handle access management in a CAM. In a CAM, the handle returned when a key search/lookup is performed happens to be the address of the memory location of the best/exact match. In contrast to a CAM, an algorithmic search engine may have no fixed relationship between a key's (and associated handle's) location within its search structure and the numeric value of the handle that a key search returns. However, both the key and the handle must be stored to ensure that the proper handle is returned when a search is performed.

While an algorithmic search engine must store both handles and keys it need not store handles in the same data structure that it uses to store search keys. In fact, having separate key and handle data-structures enables a bandwidth and/or power enhanced solution since only the best/exact match handle is fetched at the completion of a search. Storing handles separately from keys can be done by storing handle on a per level basis or storing handles in an aggregate manner for all levels.

Storing handles on a per level basis may be used for some algorithmic implementations but may not lend itself to an SPM B-Tree architecture where numerous handles can be stored per key, which may make movement between levels due to insertions/deletions difficult. Storing handles aggregately from all levels can allow for dense packaging, by tailoring the storage memory, and can allow for handle movement to be both physically and architecturally contained within the same region of the device.

Segregating handles from the search data structure may result in the need for any key data structure modifications performed due to key inserts (or deletes) to be mirrored in the handle data structure. In the case of an SPM B-Tree, insertions (or deletions) can cause hundreds or even thousands of handle movements. Therefore, an efficient movement architecture is desirable in order to facilitate timely database updates to maintain high insert/delete rates. Embodiments of the invention as described herein can efficiently modify the handle data structure related to an SPM B-Tree while allowing concurrent searches of the data structure.

Accordingly, some embodiments of the invention can segregate handles from keys to reduce handle bandwidth requirements (during both updates and searches) and/or enable dense handle packing. Handles can be efficiently packed based on per level word sizes, which may differ between levels and/or which may differ between key sizes. Handles may be stored, at most, one time per level of the search tree, once per level for longest prefix match tree, or only once per tree for an exact match tree. Implicit mapping between keys in the search structures and handles may be provided to reduce or avoid additional pointer storage which could reduce memory efficiency and/or to simplify search and modification procedures. High search rates and low search latency may be supported.

Moreover, some embodiments of the invention can support simultaneous handle modifications while searching in order to allow an increase in memory use efficiency. Handle searches and modifications may occur on different portions of handle data. Some embodiments may also support high-level commands to direct handle modification, such as move, copy (multiple handles at once) and write (single handle); support multiple databases; and/or support an embedded maintenance engine in silicon that can orchestrate all updates, interleave maintenance updates with searches and strive to use all of idle (non-search) handle memory cycles to perform updates.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An integrated circuit search engine device, comprising:
a plurality of serially connected stages, a respective one of which is configured to store therein a respective level of search keys in a multilevel tree of search keys, the plurality of serially connected stages including a first level stage that is responsive to an input search key and a last level stage that is configured to identify a best match key for the input search key;
a handle memory including a plurality of handle memory locations, a respective one of which is configured to store a search result handle; and
a handle memory access manager that is configured to
search the handle memory to retrieve a search result handle that corresponds to a best match key in response to identification of the best match key by the plurality of serially connected stages;
refrain from modifying the handle memory in response to modify instructions from the plurality of serially connected stages during active periods of the handle memory when the handle memory is being searched to retrieve a search result handle that corresponds to a best match key in response to identification of the best match key by the plurality of serially connected stages; and
modify the handle memory in response to the modify instructions from the plurality of serially connected stages during idle periods of the handle memory when the handle memory is not being searched to retrieve a search result handle that corresponds to a best match key in response to identification of the best match key by the plurality of serially connected stages.

2. A device according to claim 1 wherein the handle memory access manager comprises:
a handle lookup engine that is configured to search the handle memory to retrieve a search result handle that corresponds to a best match key in response to identification of the best match key by the plurality of serially connected stages;
a handle modification engine that is configured to modify the handle memory in response to modify instructions from the plurality of serially connected stages; and
a multiplexer that is configured to selectively connect the handle lookup engine or the handle modification engine to the handle memory under control of the handle lookup engine so that the handle lookup engine sets the active periods and the idle periods of the handle memory.

3. A device according to claim 2 wherein the handle modification engine comprises:
a modify instruction queue that is configured to receive the modify instructions from the plurality of serially connected stages, the modify instructions including therein high level commands that generate handle memory read requests and handle memory write requests;
a read request queue that is configured to store the handle memory read requests that are generated from the modify instructions;
a write request queue that is configured to store the handle memory write requests that are generated from the modify instructions; and
logic that is configured to generate the handle memory read requests and the handle memory write requests from the modify instructions and to provide the handle memory read requests and the handle memory write requests to the read request queue and the write request queue, respectively.

4. A device according to claim 3 wherein the handle modification engine further comprises a work conserving round robin device that is configured to alternately supply to the multiplexer a memory read request from the read request queue and a memory write request from the write request queue if both queues contain a request and to continue to supply to the multiplexer a memory read request or a memory write request if the write request queue or the read request queue, respectively, is empty.

5. A device according to claim 4 wherein a given modify instruction generates an initial burst of handle memory read requests and a delayed burst of handle memory write requests that are placed in the read request queue and the write request queue, respectively by the logic, such that the work conserving round robin device initially supplies handle memory read requests from the initial burst to the multiplexer until a memory write request from the delayed burst appears in the write request queue, then alternately supplies handle memory read requests and handle memory write requests to the multiplexer until remaining handle memory read requests in the initial burst are supplied to the multiplexer and then supplies remaining write requests to the multiplexer until the remaining write requests are supplied to the multiplexer.

6. A device according to claim 1 wherein the handle memory includes a same number of handle locations for each key in the multilevel tree of search keys.

7. A device according to claim 1 wherein the handle memory includes larger numbers of handle locations for keys in the first level stage compared to the last level stage of the multilevel tree of search keys.

8. A device according to claim 1 wherein the handle memory includes different numbers of handle locations per key in different ones of the stages.

9. An integrated circuit search engine device, comprising:
a plurality of serially connected stages, a respective one of which is configured to store therein a respective level of search keys in a multilevel tree of search keys, the plurality of serially connected stages including a first level stage that is responsive to an input search key and a last level stage that is configured to identify a best match key for the input search key;
a handle memory including a plurality of handle memory locations, a respective one of which is configured to store a search result handle;
a handle lookup engine that is configured to search the handle memory to retrieve a search result handle that corresponds to a best match key in response to identification of the best match key by the plurality of serially connected stages;
a handle modification engine that is configured to modify the handle memory in response to modify instructions from the plurality of serially connected stages; and
a multiplexer that is configured to selectively connect the handle lookup engine or the handle modification engine to the handle memory under control of the handle lookup engine.

10. A device according to claim 9 wherein the handle modification engine comprises:
a modify instruction queue that is configured to receive the modify instructions from the plurality of serially connected stages, the modify instructions including therein high level commands that generate handle memory read requests and handle memory write requests;
a read request queue that is configured to store the handle memory read requests that are generated from the modify instructions;

a write request queue that is configured to store the handle memory write requests that are generated from the modify instructions; and logic that is configured to generate the handle memory read requests and the handle memory write requests from the modify instructions and to provide the handle memory read requests and the handle memory write requests to the read request queue and the write request queue, respectively.

11. A device according to claim 10 wherein the handle modification engine further comprises a work conserving round robin device that is configured to alternately supply to the multiplexer a memory read request from the read request queue and a memory write request from the write request queue if both queues contain a request and to continue to supply to the multiplexer a memory read request or a memory write request if the write request queue or the read request queue, respectively, is empty.

12. A device according to claim 11 wherein a given modify instruction generates an initial burst of handle memory read requests and a delayed burst of handle memory write requests that are placed in the read request queue and the write request queue, respectively by the logic, such that the work conserving round robin device initially supplies handle memory read requests from the initial burst to the multiplexer until a memory write request from the delayed burst appears in the write request queue, then alternately supplies handle memory read requests and handle memory write requests to the multiplexer until remaining handle memory read requests in the initial burst are supplied to the multiplexer and then supplies remaining write requests to the multiplexer until the remaining write requests are supplied to the multiplexer.

13. A device according to claim 9 wherein the handle memory includes a same number of handle locations for each key in the multilevel tree of search keys.

14. A device according to claim 9 wherein the handle memory includes larger numbers of handle locations for keys in the first level stage compared to the last level stage of the multilevel tree of search keys.

15. A device according to claim 9 wherein the handle memory includes different numbers of handle locations per key in different ones of the stages.

16. A handle management method for an integrated circuit search engine device that includes a plurality of serially connected stages, a respective one of which is configured to store therein a respective level of search keys in a multilevel tree of search keys, the plurality of serially connected stages including a first level stage that is responsive to an input search key and a last level stage that is configured to identify a best match key for the input search key, the integrated search engine device also including a handle memory including a plurality of handle memory locations, a respective one of which is configured to store a search result handle, the handle management method comprising:

searching the handle memory to retrieve a search result handle that corresponds to a best match key in response to identification of the best match key by the plurality of serially connected stages;

refraining from modifying the handle memory in response to modify instructions from the plurality of serially connected stages during active periods of the handle memory when the handle memory is being searched to retrieve a search result handle that corresponds to a best match key in response to identification of the best match key by the plurality of serially connected stages; and modifying the handle memory in response to the modify instructions from the plurality of serially connected stages during idle periods of the handle memory when the handle memory is not being searched to retrieve a search result handle that corresponds to a best match key in response to identification of the best match key by the plurality of serially connected stages.

17. A method according to claim 16 further comprising:

receiving the modify instructions from the plurality of serially connected stages, the modify instructions including therein high level commands that generate handle memory read requests and handle memory write requests;

generating the handle memory read requests and handle memory write requests from the high level commands;

storing the handle memory read requests that are generated from the modify instructions in a read request queue; and storing the handle memory write requests that are generated from the modify instructions in a write request queue.

18. A method according to claim 17 further comprising:

alternately supplying to the handle memory a memory read request from the read request queue and a memory write request from the write request queue if both queues contain a request; and supplying to the handle memory a memory read request or a memory write request if the write request queue or the read request queue, respectively, is empty.

19. A method according to claim 17 wherein a given modify instruction generates an initial burst of handle memory read requests and a delayed burst of handle memory write requests that are stored in the read request queue and the write request queue, respectively, the method further comprising:

initially supplying handle memory read requests from the initial burst to the handle memory until a memory write request from the delayed burst appears in the write request queue; then alternately supplying handle memory read requests and handle memory write requests to the handle memory until remaining handle memory read requests in the initial burst are supplied to the handle memory; and then supplying remaining write requests to the handle memory until the remaining write requests are supplied to the handle memory.

20. A method according to claim 16 wherein the handle memory includes a same number of handle locations for each key in the multilevel tree of search keys.

21. A method according to claim 16 wherein the handle memory includes a larger number of handle locations for each key in first level stage compared to the last level stage of the multilevel tree of search keys.

22. A method according to claim 16 wherein the handle memory includes different numbers of handle locations per key in different ones of the stages.

* * * * *